United States Patent
Dürrer et al.

(10) Patent No.: US 7,744,126 B2
(45) Date of Patent: Jun. 29, 2010

(54) TENSIONING DEVICE FOR SEATBELTS WITH AN OLIVE-SHAPED PISTON

(75) Inventors: Michael Dürrer, Neumünster (DE); Jens Ehlers, Horst (DE); Maren Leyffer, Wedel (DE)

(73) Assignee: Autoliv Development AB, Vargarda (SE)

( * ) Notice: Subject to any disclaimer, the term of this patent is extended or adjusted under 35 U.S.C. 154(b) by 202 days.

(21) Appl. No.: 12/090,605

(22) PCT Filed: Oct. 10, 2006

(86) PCT No.: PCT/EP2006/009759

§ 371 (c)(1),
(2), (4) Date: Apr. 17, 2008

(87) PCT Pub. No.: WO2007/045376

PCT Pub. Date: Apr. 26, 2007

(65) Prior Publication Data

US 2008/0277520 A1    Nov. 13, 2008

(30) Foreign Application Priority Data

Oct. 18, 2005    (DE) .................... 10 2005 049 659

(51) Int. Cl.
B60R 22/46    (2006.01)
(52) U.S. Cl. ...................................... 280/806; 297/479
(58) Field of Classification Search ................ 280/806; 297/469, 476, 479, 480
See application file for complete search history.

(56) References Cited

U.S. PATENT DOCUMENTS 5,207,618 A  *  5/1993  Nishizawa .................. 474/101
5,450,723 A  *  9/1995  Fohl ............................ 60/638
5,468,019 A  * 11/1995  Blase et al. ................. 280/805
5,887,897 A  *  3/1999  Gill et al. .................... 280/806
5,908,222 A     6/1999  Wier
6,135,252 A  * 10/2000  Knotts ........................ 188/374

(Continued)

FOREIGN PATENT DOCUMENTS

DE    12 74 301 B    8/1968

(Continued)

*Primary Examiner*—Paul N Dickson
*Assistant Examiner*—Nicole Verley
(74) *Attorney, Agent, or Firm*—Brinks Hofer Gilson & Lione

(57) ABSTRACT

A tensioning device for a seatbelt system in motor vehicles with a driving arrangement that comprises a tube having at least one tube section bent with a radius of curvature, and a piston guided movably in said tube, whereby the piston is connected via a driving cable to the part of the seatbelt system which carries out the tensioning movement, and whereby the piston can be moved in a longitudinal movement through the tube by means of a pyrotechnic drive, and the driving cable is fixed to the piston by means of a holding part held by the piston. The piston (14) is configured in the form of an olive with a larger radius in the longitudinal direction of the tube (10) than the effective radius in the transverse direction of the tube (10) and is provided with a bore (15) for passing through the driving cable (20) that is held in a compression sleeve (16) fixed on the side of the piston (14) that points in the direction of movement of the piston (14).

15 Claims, 4 Drawing Sheets

U.S. PATENT DOCUMENTS

| | | | |
|---|---|---|---|
| 6,139,058 A * | 10/2000 | Bohmler | 280/806 |
| 6,250,720 B1 * | 6/2001 | Wier | 297/468 |
| 6,299,211 B1 * | 10/2001 | Wier | 280/806 |
| 6,663,037 B2 * | 12/2003 | Matsumura | 242/374 |
| 7,125,396 B2 * | 10/2006 | Leinsing et al. | 604/167.03 |
| 7,172,218 B2 * | 2/2007 | Nakano et al. | 280/806 |
| 7,533,902 B2 * | 5/2009 | Arnold et al. | 280/806 |
| 7,631,900 B2 * | 12/2009 | Nakayama et al. | 280/806 |
| 2006/0279077 A1 * | 12/2006 | Nakano et al. | 280/806 |
| 2007/0100284 A1 * | 5/2007 | Leinsing et al. | 604/164.01 |
| 2008/0012283 A1 * | 1/2008 | Woecht | 280/806 |
| 2009/0175747 A1 * | 7/2009 | LeBoeuf et al. | 417/545 |
| 2009/0184508 A1 * | 7/2009 | Kohama | 280/806 |

FOREIGN PATENT DOCUMENTS

| | | |
|---|---|---|
| EP | 0 803 399 B1 | 10/2001 |
| EP | 1 283 138 A1 | 2/2003 |
| FR | 2 491 647 A1 | 4/1982 |
| FR | 2 494 997 A1 | 6/1982 |

* cited by examiner

TENSIONING DEVICE FOR SEATBELTS WITH AN OLIVE-SHAPED PISTON

CROSS REFERENCE TO RELATED APPLICATIONS

This application claims priority to German patent application number 10 2005 049 659.8, filed Oct. 18, 2005 and PCT/EP2006/009759, filed Oct. 10, 2006.

FIELD OF THE INVENTION

The present invention relates to a tensioning device for a seatbelt system in motor vehicles with a driving arrangement that comprises a tube having at least one tube section bent with a radius of curvature, and a piston guided movably in the tube, whereby the piston is connected via a driving cable to the part of the seatbelt system which carries out the tensioning movement, and whereby the piston can be moved in a longitudinal movement through the tube by means of a pyrotechnic drive, and the driving cable is fixed to the piston by means of a holding part held by the piston.

BACKGROUND OF THE INVENTION

A tensioning device with the above mentioned characteristics is described in EP 0 803 399 B1. In so far as the installation conditions of tensioning devices of this type also require bent tubes with relatively small radii of curvature, the piston running through the tube is configured in the known tensioning device such that the front end of the piston pointing in the direction of movement does not abut against the inner side of the tube, but is separated therefrom by a gap. The width of the gap is matched to the radius of curvature of the tube such that the piston cannot become jammed when moving through the tube. In the area facing the pyrotechnic drive, the body of the piston has countersunk gaskets that seal the piston against the tube.

With the known tensioning device there is the disadvantage that the required accuracy in machining the piston with respect to its radial clearance with the inside of the tube is maintained in order to prevent jamming of the piston inside the tube; at the same time, the tube with its radius of curvature also has to be formed with the corresponding accuracy so that piston and tube fit one another. Likewise, the required gasket has to ensure a good, uniform seal over the entire movement of the piston inside the tube because, as a result of the gap left at the front of the piston, the piston inside the tube would otherwise not be adequately sealed.

Therefore, it is an object of the present invention to simplify the design of the piston in a tensioning device of the above type, and at the same time to improve the sealing action of the piston inside the tube, and finally, to prevent jamming of the piston in a reliable manner.

The solution of this task, including advantageous embodiments and further developments of the present invention, will become apparent from the claims following this description.

SUMMARY OF THE INVENTION

The fundamental idea of the present invention proposes that the piston is configured in the form of an olive or generally ellipsoidal shape with a larger radius in the longitudinal direction of the tube than the effective radius in the transverse direction of the tube and is provided with a bore for passing a driving cable through, the cable being held in a compression sleeve which is fixed on the side of the piston that faces in the direction of movement of the piston. The present invention has the advantage that as a result of the olive shape of the piston, the external sealing surfaces against the tube are enlarged, such that when the piston passes through a bent tube, the sealing surfaces each remain abutted against the internal wall of the tube, so that good sealing of the piston in all states of movement is ensured. At the same time, the compression sleeve fixed to the piston provides for the sealing of the bore required for the passage of the cable through the piston.

With regard to the design of the compression sleeve, according to an exemplary embodiment of the present invention, it is provided that the compression sleeve is configured with a tube-shaped section enclosing the driving cable and a disk-like projecting piece, whereby the tube-shaped section of the compression sleeve extends into the bore of the piston and the disk-like projecting piece abuts against the front side of the piston. Within the framework of this embodiment, the tube-shaped section surrounding the cable is fixed by the piston and cannot expand under the corresponding tensile load. The disk-like projecting piece abutting against the external front side of the piston provides for adequate sealing of the cable passage through the piston and at the same time ensures an adequate load transmission surface from the piston to the driving cable.

The end of the tube-shaped section of the compression sleeve preferably does not lie on a projecting piece configured in the piston bore, so that within the framework of a corresponding piston load, an axial shortening and simultaneous radial expansion of the piston is possible, in order to improve the seal. But within the framework of a corresponding piston load, according to an exemplary embodiment of the invention, it can also be provided that the tube-shaped section of the compression sleeve is supported on the projecting piece configured in the piston bore in order to act as an additional supporting surface during deformation of the piston, and thus to limit deformation of the piston.

With respect to the design of the piston, according to an exemplary embodiment of the invention, it is provided that the piston feature a circumferential groove in the area with the smaller radius close to the tube, whose external circumferential borders have a bead-like shape that protrudes outward and two sealing beads spaced apart from one another with associated sealing surfaces facing the tube. According to this exemplary embodiment, the already extended contact surface resulting from the olive-shaped piston is again divided by the arranged groove, so that two spaced sealing beads with the corresponding contact surfaces are configured. In particular, when the piston passes through a bent tube section, one of the sealing beads with associated abutting surfaces will abut against the associated tube wall.

According to an exemplary embodiment of the present invention, it is provided that the area of the piston adjacent to the front sealing bead in the direction of motion of the piston is configured as a truncated cone in the direction of the forward compression sleeve, whereby it can further be provided that the truncated cone area of the piston is configured such that an enlarged contact surface for the disk-like projecting piece of the compression sleeve is configured at its front end. Thus the contact surface for the compression sleeve is enlarged, and hence the load transmission improved.

According to alternative exemplary embodiments of the invention, the piston area adjacent to the rear sealing bead in the direction of piston movement may likewise be configured symmetrically as a truncated cone at the front, or else as a cylinder, as a variation thereof.

According to an exemplary embodiment of the present invention, it is provided that on the side of the piston facing away from the compression sleeve, a guiding part is disposed against the front side of the piston and is mounted on the driving cable. In so far as a driving cable running through a bent tube section always tends to establish a straight connection between its entrance into the tube and the piston running through the tube, the result will be that the driving cable enters the piston at a slant, possibly tilting the piston and degrading the seal of the piston against the tube as well as against the driving cable. In this respect, the additionally arranged guiding part offers the advantage that over a greater part of its distance from the piston, the driving cable is guided in the center of the tube, such that tilting of the piston inside the tube is prevented.

According to a first exemplary embodiment of the invention, it can be provided that the guiding part is configured as a sphere.

Alternatively, it can be provided that the guiding part is configured as a cylindrical guide piston, and that on its contact surface facing the piston it features a cap for a positive abutment with the piston surface. In this respect, it can specifically be provided that the cylindrical guide piston be configured in a pot shape and open on the side opposite the direction of movement of the piston, whereby it can be provided that the external borders of the cavity of the pot-shaped guide piston feature an inward bevel. With this measure, tilting of the guiding part inside the tube is prevented.

The guiding part may either be of metal or else a suitable plastic material, as the guiding part is not subject to an intense load.

BRIEF DESCRIPTION OF THE DRAWINGS

The drawings show exemplary embodiments of the invention, which are described in more detail below: The drawings show.

DETAILED DESCRIPTION OF THE INVENTION

Figure 1:
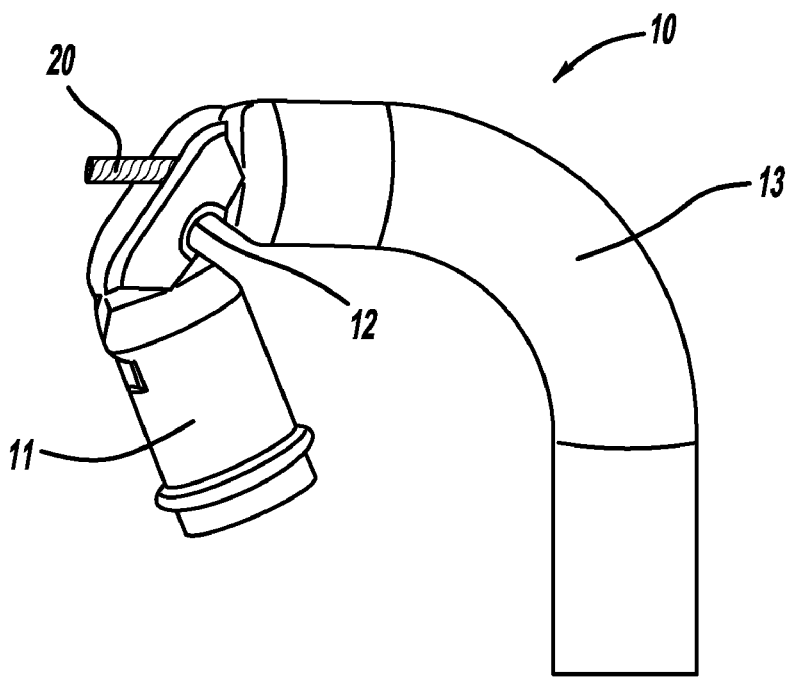
FIG. 1 is a schematic perspective view of a tensioning tube.

The tensioning tube 10 illustrated in FIG. 1 for accommodating and guiding the piston as the subject matter of the invention has a gas generator receptacle 11, to which the actual tube 10 is connected via a connection point or joint 12. In the area of the connection point 12 there is a driving cable 20 inserted into the tensioning tube 10. The tensioning tube 10 has a tube bend 13 that must be passed through by the piston, which is to be described below.

Figure 2:
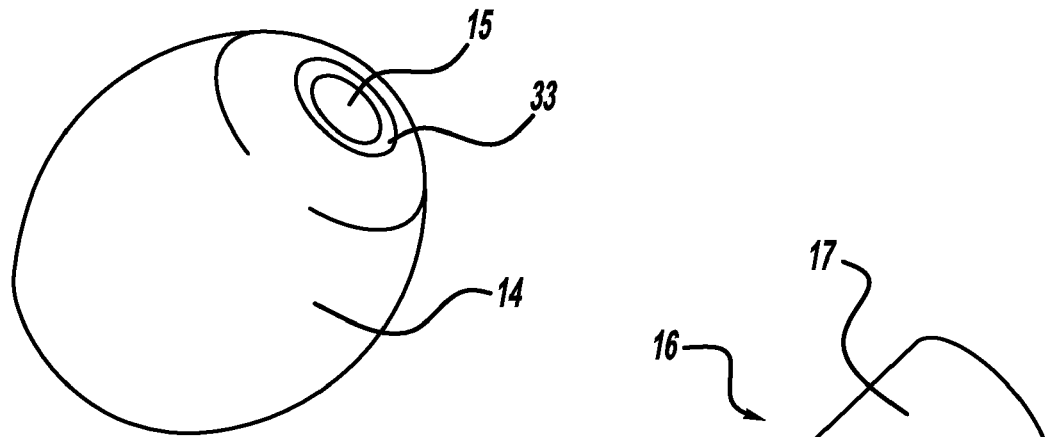
FIG. 2 is a perspective illustration of a piston.

As is apparent from FIG. 2, the piston 14 which is disposed into and moves within tube 10 and has an overall olive or ellipsoidal shape with a larger radius in the longitudinal direction of the piston than in the transverse direction of the piston, with a bore 15 arranged in the piston in the longitudinal direction.

Figure 3:
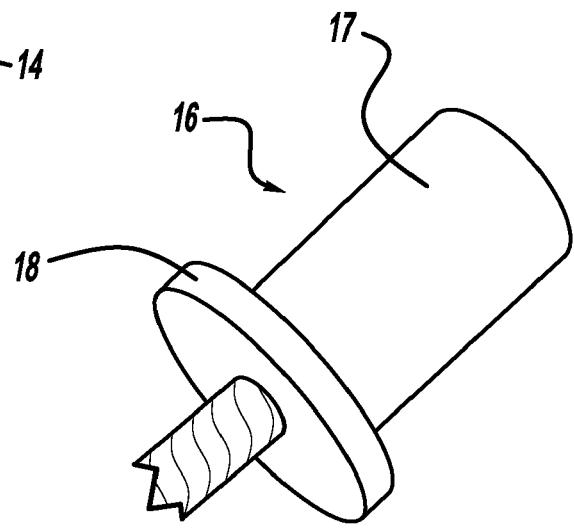
FIG. 3 is a perspective individual illustration of a compression sleeve.

Since the driving cable 20 has to be connected with the piston 14, a corresponding compression sleeve 16 is provided as shown in FIG. 3 having a tube-shaped section 17 and a disk-like projecting piece 18 situated at the end of the tube section 17. The tube-shaped section 17 is configured such that it encloses and is fixed to the driving cable 20.

Figure 4:
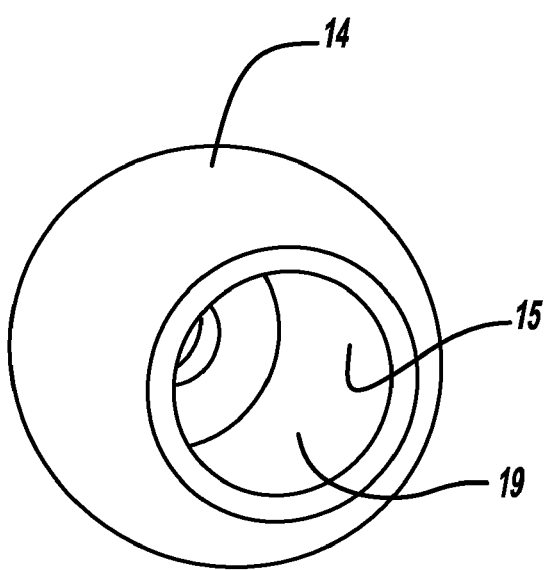
FIG. 4 is another perspective view of the piston according to FIG. 2.

As is apparent from FIG. 4, the bore 15 in the piston 14 is designed such that the compression sleeve 16 can be inserted with the tube-shaped section 17 into the bore 15. The dimensions of the bore 15 and of the compression sleeve 16 are matched to one another such that the front end of the tube-shaped section 17 still does not rest on or contact the shoulder 19 formed in the channel 15 of the piston 14; thus it is possible for the generally ellipsoidal or olive shaped piston 14 to shorten axially under the corresponding load when it is formed by gas pressure to travel within tube 10 and hence widen radially. During the tensioning movement, and based on the thus-permitted axial shortening of the piston 14, the front end of the tube-shaped section 17 can, however, in that condition abut against the shoulder 19 in order to act as an additional supporting area and limit further deformation of the piston 14.

Figure 5:
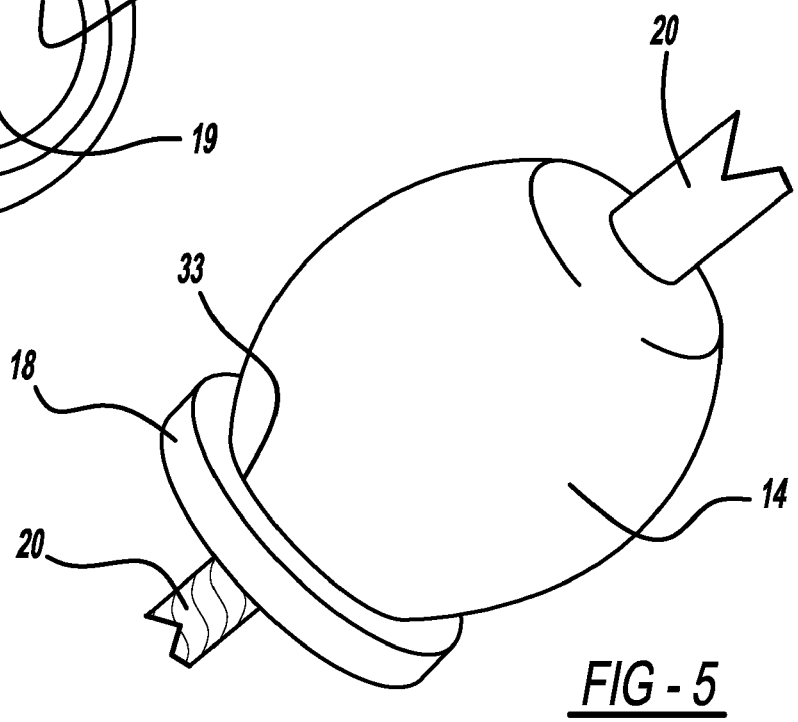
FIG. 5 is a perspective illustration of the piston according to Figure or 4 assembled with the compression sleeve according to FIG. 3.

Furthermore, in the assembled state as illustrated in FIG. 5, the disk-like projecting piece 18 externally abuts the flattened front surface 33 of the piston 14. The assembly according to FIG. 5 on the one hand ensures good load transmission from the piston 14, which is driven along the tensioning tube 10 by the released gas, to the driving cable 20, whereby the passage of the cable through the piston 14 is simultaneously sealed.

Figure 6:
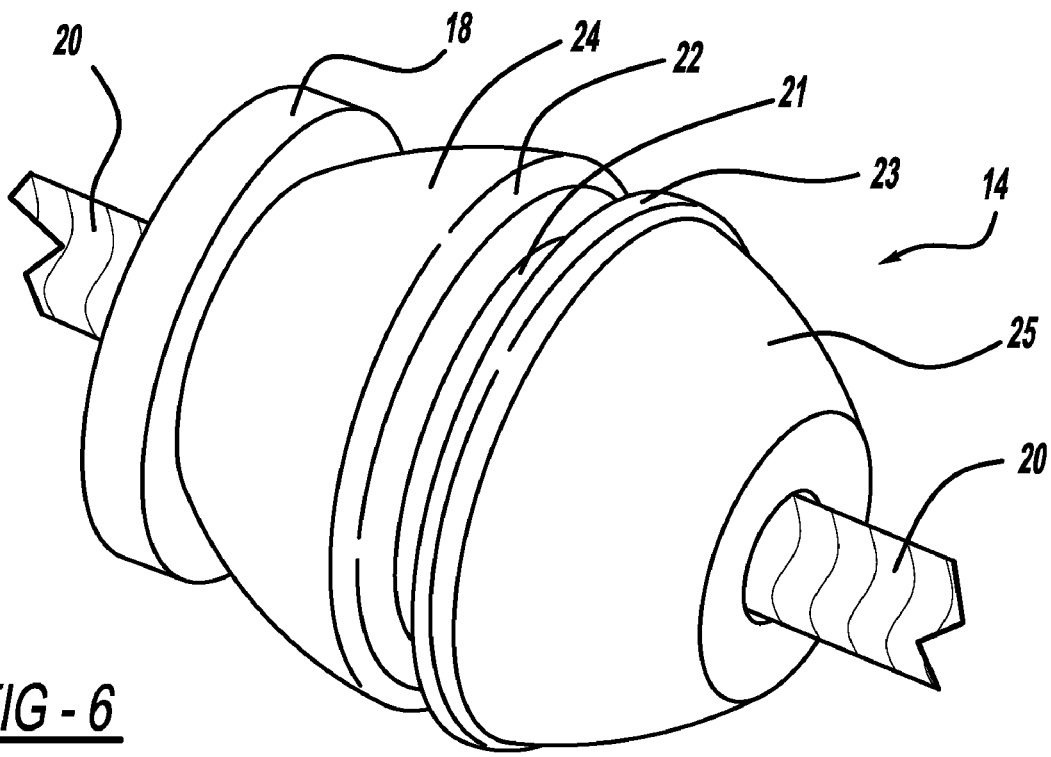
FIG. 6 is an illustration of another embodiment of the piston according to FIG. 5.

In the exemplary alternate embodiment illustrated in FIG. 6, in its area adjacent to the tube, the piston is provided with a circumferential groove 21, whose external circumferential borders form outward protrusions such that two sealing beads 22, 23 spaced apart from one another are configured with accordingly arranged sealing surfaces over the width of the groove 21. Here the front sealing bead in the direction of movement of the piston 14 is designated 22, and the rear sealing bead designated 23. Accordingly, this creates a front section 24 of the piston 14 leading to the disk-like projecting piece 18 of the compression sleeve 16, as well as a rear section designated 25. In the exemplary embodiment illustrated in FIG. 6, the overall olive or generally ellipsoidal shape of the piston 14 is preserved.

Figure 7:
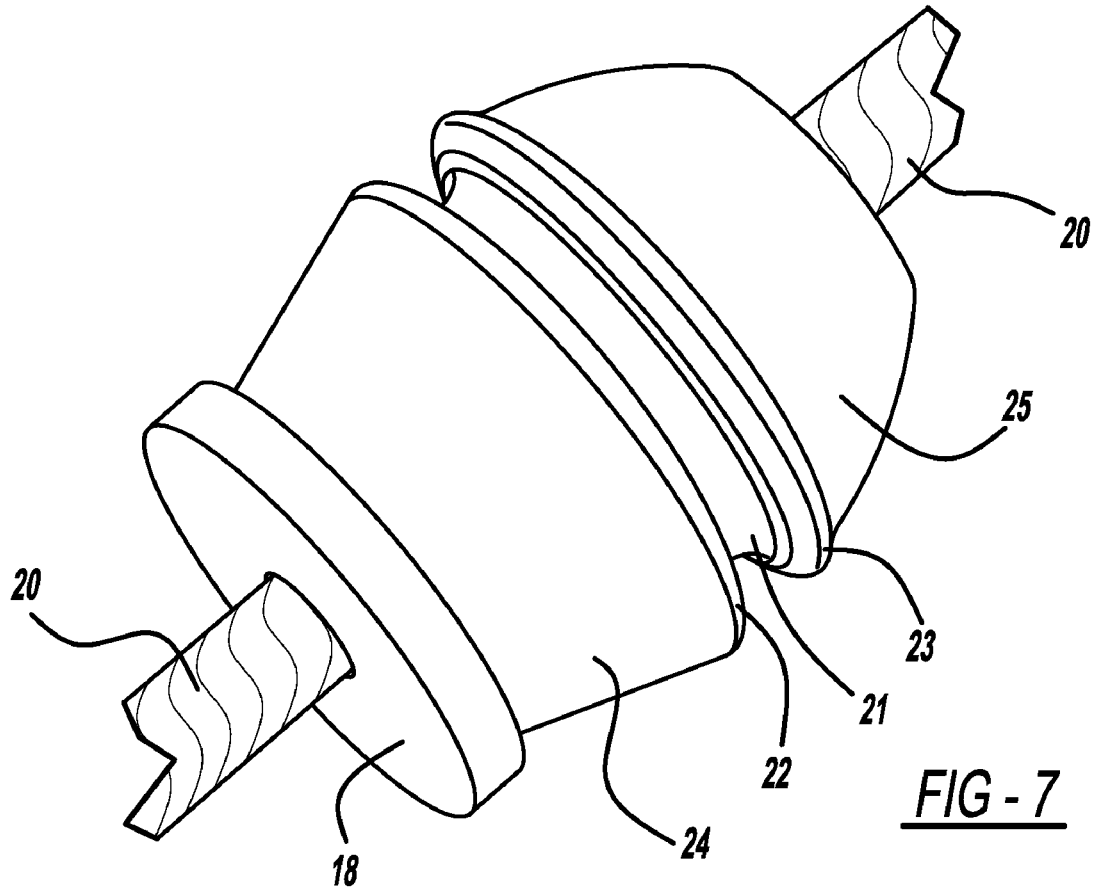
FIG. 7 is an illustration of another embodiment of the piston according to FIG. 5.

In the exemplary embodiment illustrated in FIG. 7, the front section 24 of the piston 14 is now configured as a truncated cone, which creates a larger front surface 33 on its front side for contact with the disk-like projecting piece 18 of the compression sleeve 16.

Figure 8:
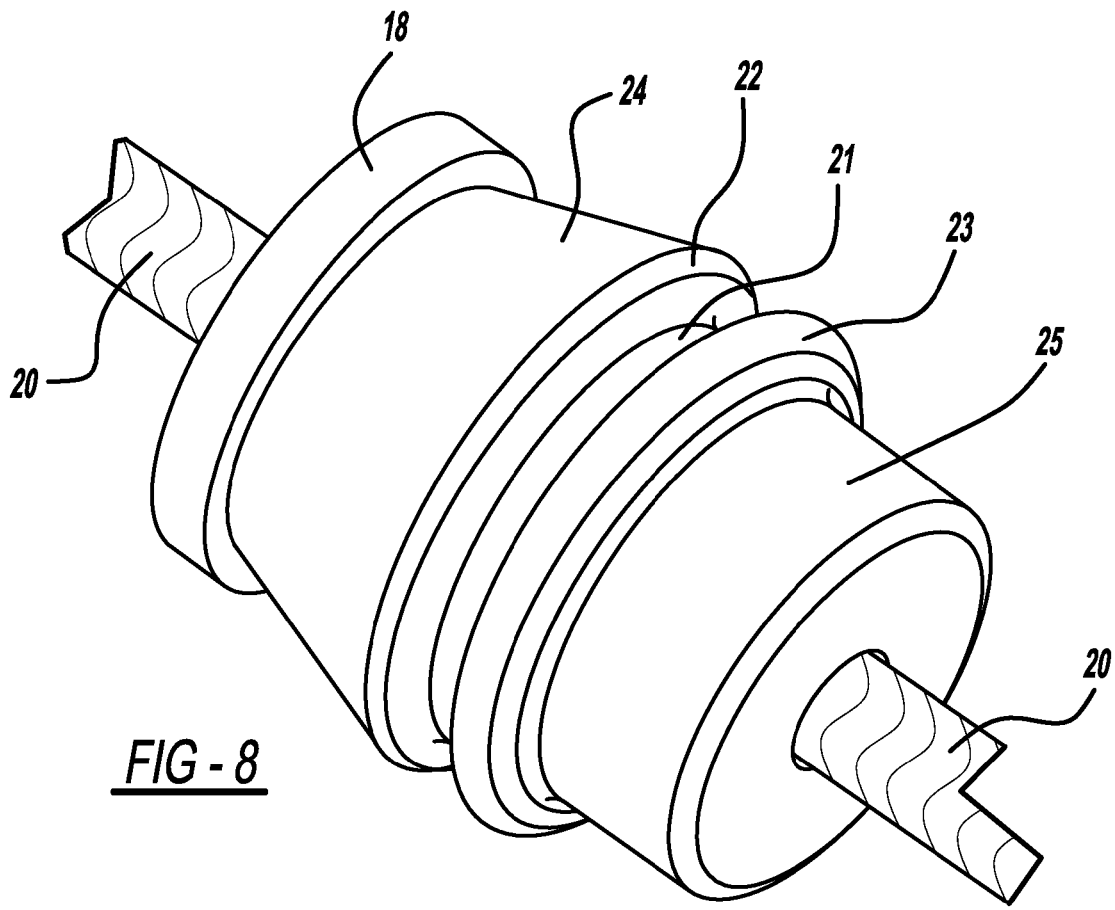
FIG. 8 is an illustration of another embodiment of the piston according to FIG. 5.

In the exemplary alternative embodiment illustrated in FIG. 8, in addition to the truncated cone design of the front section 24 of the piston 14, the rear section 25 is essentially configured as a cylinder in order to provide a larger pressure surface for the gas impinging at this point.

Figure 9:
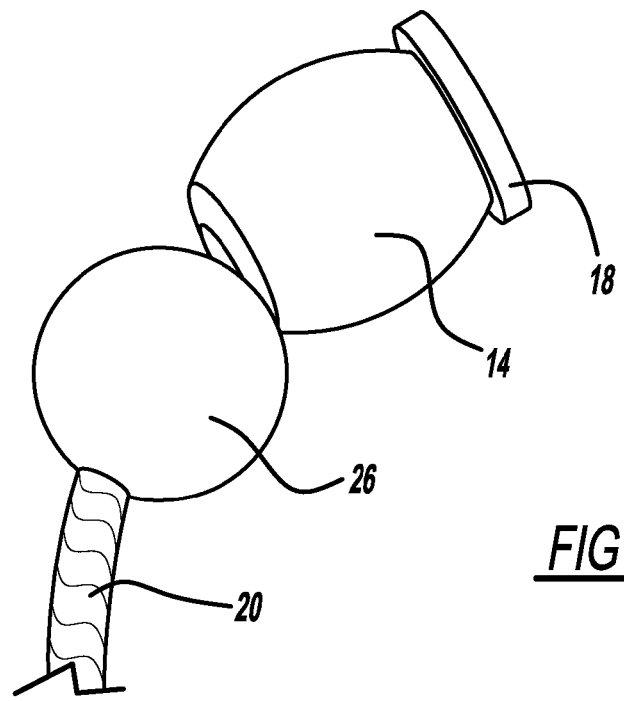
FIG. 9 shows a piston with a spherical guiding part.

In order to ensure better guiding of the driving cable 20 inside the tensioning tube 10, especially on passage of the piston 14 through the tube bend 13, an additional guiding part 26 in the form of a sphere mounted on the driving guide is provided in the exemplary embodiment illustrated in FIG. 9, with the sphere 26 being movable with respect to the piston 14. As the sphere 26 with its external surfaces likewise is supported on the internal wall of the tensioning tube 10, the driving cable 20 is held and guided in the center of the tensioning tube 10 over a longer distance. Thus, jamming of the entrance of the cable in the piston 14 is prevented.

Figure 10:
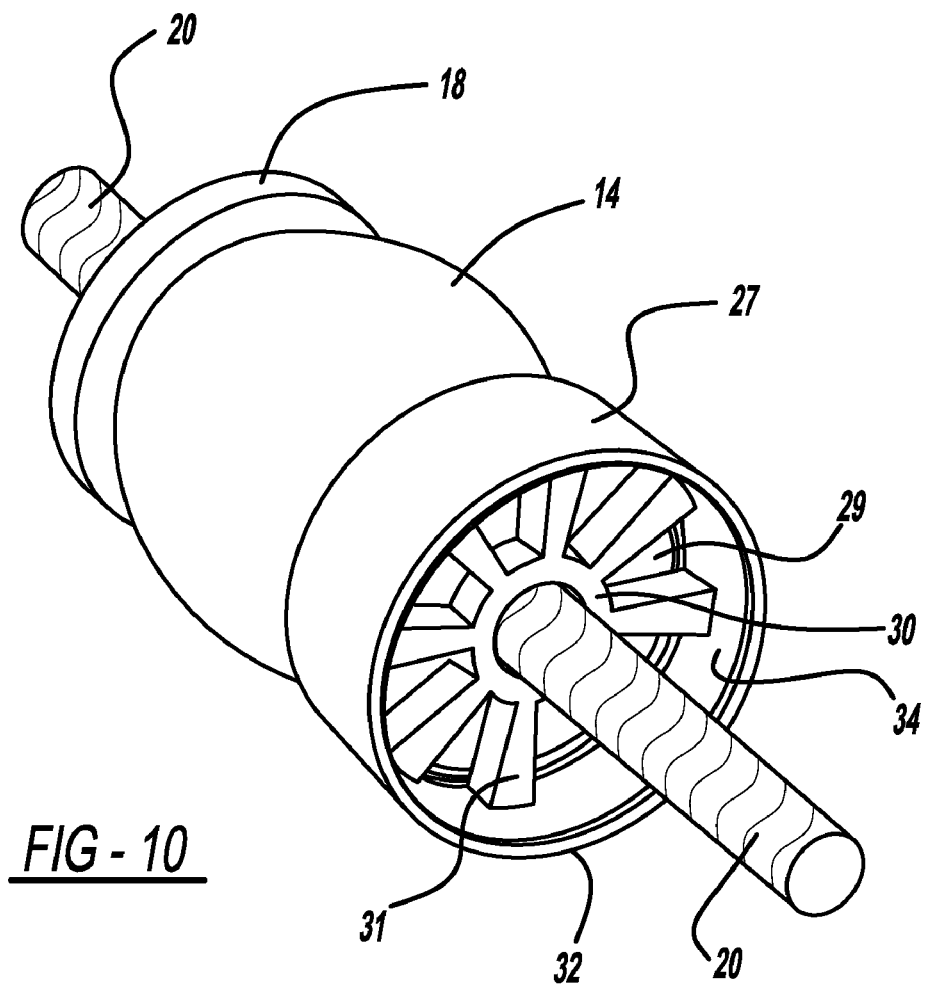
FIG. 10 shows the object of FIG. 9 with different design of the guiding part.

In the further alternative exemplary embodiment illustrated in FIG. 10, the guiding part is configured as a pot-shaped cylindrical guide piston 27 with a cavity 29, in whose interior the guide piston 27 has a lead-through flange 30 for the driving cable 20, with spokes 31 that originate at this point and are connected with the outer border of the pot-shaped guide piston 27. As is not illustrated further, in its contact surface against the piston 14, the guide piston 27 can have a cap to accommodate the assigned piston surface 14 in a positive fit. For better assembly of the belt tensioner, the outer border 34 of the guide piston 27 enclosing the cavity 29 may be provided with an inward bevel 32, as this will facilitate the insertion of the piston into the tube.

The features of the subject matter of this document disclosed in the preceding description, claims, abstract, and drawings can each be fundamental to the implementation of the present invention in its different embodiments alone or in any combination.

While the above description constitutes the preferred embodiment of the present invention, it will be appreciated that the invention is susceptible to modification, variation and change without departing from the proper scope and fair meaning of the accompanying drawings.

The invention claimed is:

1. A tensioning device for a seatbelt system in motor vehicles with a driving arrangement that comprises a tube having at least one tube section bent with a radius of curvature, and a piston guided movably in the tube, whereby the piston is connected via a driving cable to a part of the seatbelt system which carries out the tensioning movement, and whereby the piston is movable for longitudinal movement through the tube by means of a pyrotechnic drive, and the driving cable is fixed to the piston by a holding part held by the piston, the piston is configured having a generally ellipsoidal form with a larger radius in the longitudinal direction of the tube than the effective radius in the transverse direction of the tube and is provided with a bore for passing through the driving cable that is held in a compression sleeve fixed on the side of the piston that faces in the direction of movement of the piston.

2. The tensioning device according to claim 1, wherein the compression sleeve is configured with a tube-shaped section enclosing the driving cable and an adjacent disk-like projecting piece adjacent to the compression sleeve, whereby the tube-shaped section of the compression sleeve extends into the bore of the piston and the disk-like projecting piece abuts against the front side of the piston.

3. The tensioning device according to claim 2, wherein the tube-shaped section of the compression sleeve abuts against a shoulder configured in the bore of the piston with the front side of the shoulder when the piston driven for movement in the tube and a compression force is applied to the piston, and the tube-shaped section does not abut against the shoulder when no compression force is applied to the piston.

4. A tensioning device according to claim 1, wherein the piston features a circumferential groove whose exterior circumferential boundaries are formed to protrude outward, and form two spaced sealing beads forming a front sealing bead and a rear sealing bead with associated sealing surfaces.

5. The tensioning device according to claim 4, the area of the piston adjacent to the front sealing bead in the direction of movement of the piston is configured as a truncated cone in the direction of the compression sleeve.

6. The tensioning device according to claim 5, wherein the truncated cone area of the piston is configured such that it forms an enlarged contact surface for the disk-like projecting piece of the compression sleeve at the front end of the sleeve.

7. The tensioning device according to claim 4, wherein the area of the piston adjacent to the rear sealing bead (23) in the direction of movement of the piston (14) is configured as a truncated cone.

8. The tensioning device according to claim 4, wherein the area of the piston adjacent to the rear sealing bead in the direction of the piston is configured as a cylinder.

9. The tensioning device according to claim 1, wherein on the side of the piston facing away from the compression sleeve, a guiding part abutting against the front side of the piston is arranged and mounted on the driving cable.

10. The tensioning device according to claim 9, wherein the guiding part is configured as a sphere.

11. The tensioning device according to claim 9, wherein the guiding part is configured as a cylindrical guide piston and on its contact surface facing the piston it has a cap for positive-abutment with the piston surface.

12. The tensioning device according to claim 11, wherein the cylindrical guide piston is pot-shaped and open on the side opposite the direction of movement of the piston.

13. The tensioning device according to claim 12, wherein the external borders of the cavity of the pot-shaped guide piston have an inward bevel.

14. The tensioning device according to claim 9, wherein the guiding part is made of metal.

15. The tensioning device according to claim 9, wherein the guiding part is made of a plastic material.

* * * * *

UNITED STATES PATENT AND TRADEMARK OFFICE
CERTIFICATE OF CORRECTION

PATENT NO. : 7,744,126 B2  Page 1 of 1
APPLICATION NO. : 12/090605
DATED : June 29, 2010
INVENTOR(S) : Michael Dürrer et al.

It is certified that error appears in the above-identified patent and that said Letters Patent is hereby corrected as shown below:

In the Claims

In column 6, claim 3, line 4, after "of the shoulder when the piston" insert --is--.

Signed and Sealed this

Twenty-first Day of December, 2010

David J. Kappos
*Director of the United States Patent and Trademark Office*